United States Patent
Kreutzig

(10) Patent No.: US 8,699,158 B1
(45) Date of Patent: Apr. 15, 2014

(54) NIGHT VISION FILTER FOR USE WITH COMPUTER MONITOR SCREENS AND THE LIKE

(75) Inventor: Kirk Kreutzig, Woodridge, IL (US)

(73) Assignee: Spectrum Technologies, Inc., Naperville, IL (US)

( * ) Notice: Subject to any disclaimer, the term of this patent is extended or adjusted under 35 U.S.C. 154(b) by 0 days.

(21) Appl. No.: 13/483,476

(22) Filed: May 30, 2012

(51) Int. Cl.
*G02B 5/22* (2006.01)

(52) U.S. Cl.
USPC .......................................... 359/885; 359/892

(58) Field of Classification Search
USPC ......................................................... 359/885
See application file for complete search history.

(56) References Cited

U.S. PATENT DOCUMENTS

| | | |
|---|---|---|
| 3,294,556 A | 12/1966 | Harrington |
| 3,571,649 A | 3/1971 | Bush, Jr. |
| 3,588,215 A | 6/1971 | Singh |
| 3,619,624 A | 11/1971 | Sorenson |
| 3,929,487 A | 12/1975 | Singh |
| 4,202,601 A | 5/1980 | Burbo et al. |
| 4,542,959 A | 9/1985 | Kreutzig |
| H0001645 H | 5/1997 | Lewis |
| 6,075,661 A | 6/2000 | Gross et al. |
| 6,088,174 A | 7/2000 | Cox |
| 6,158,865 A | 12/2000 | Kreutzig |
| 6,614,606 B2 | 9/2003 | Jones |
| 6,862,144 B1 | 3/2005 | Aguero et al. |
| 7,240,370 B2 | 7/2007 | Lerner |
| 7,510,340 B2 | 3/2009 | Laganas |
| 7,585,080 B2 | 9/2009 | Ballard |
| 7,648,291 B2 | 1/2010 | Laganas |
| 7,721,480 B2 | 5/2010 | Campeau |
| 7,821,707 B2 | 10/2010 | Neff |
| 8,226,251 B1 | 7/2012 | Kreutzig |
| 2003/0133207 A1* | 7/2003 | Minami et al. ................ 359/885 |
| 2007/0013800 A1 | 1/2007 | Pope |
| 2007/0041112 A1 | 2/2007 | Browning |

OTHER PUBLICATIONS

"Multi-Flex Flip-Open Scope Covers" from Butler Creek Products website found at www.butler-creek.com/products/scopes_multi_flex.html.
"Flip-Open Scope Covers" from Butler Creek Products website found at www.butler-creek.com/products/scopes_flip_open.html.
Hurst, "Colour, A Handbook of the Theory of Colour", pp. 34-35, 49 (1900).
Kuleshov et al, "Thin-film absorption light filters", Sov. J. Opt. Technol., 46 (1), p. 51 (1979).
Rolands, "The Underwater Photographer's Handbook", pp. 74-75.

* cited by examiner

*Primary Examiner* — Jade R Chwasz
(74) *Attorney, Agent, or Firm* — Todd S. Parkhurst; Hughes Socol Piers Resnick & Dym, Ltd.

(57) ABSTRACT

A light-altering filter for use by military and law-enforcement personnel in lowlight environments is disclosed. The filter can be placed between a lit computer monitor screen and the face of the computer user. Light coming from the monitor screen is modified by the filter so that the night vision capabilities of the computer user are not adversely affected, and splash-back reflective illumination of the user is minimized.

11 Claims, 2 Drawing Sheets

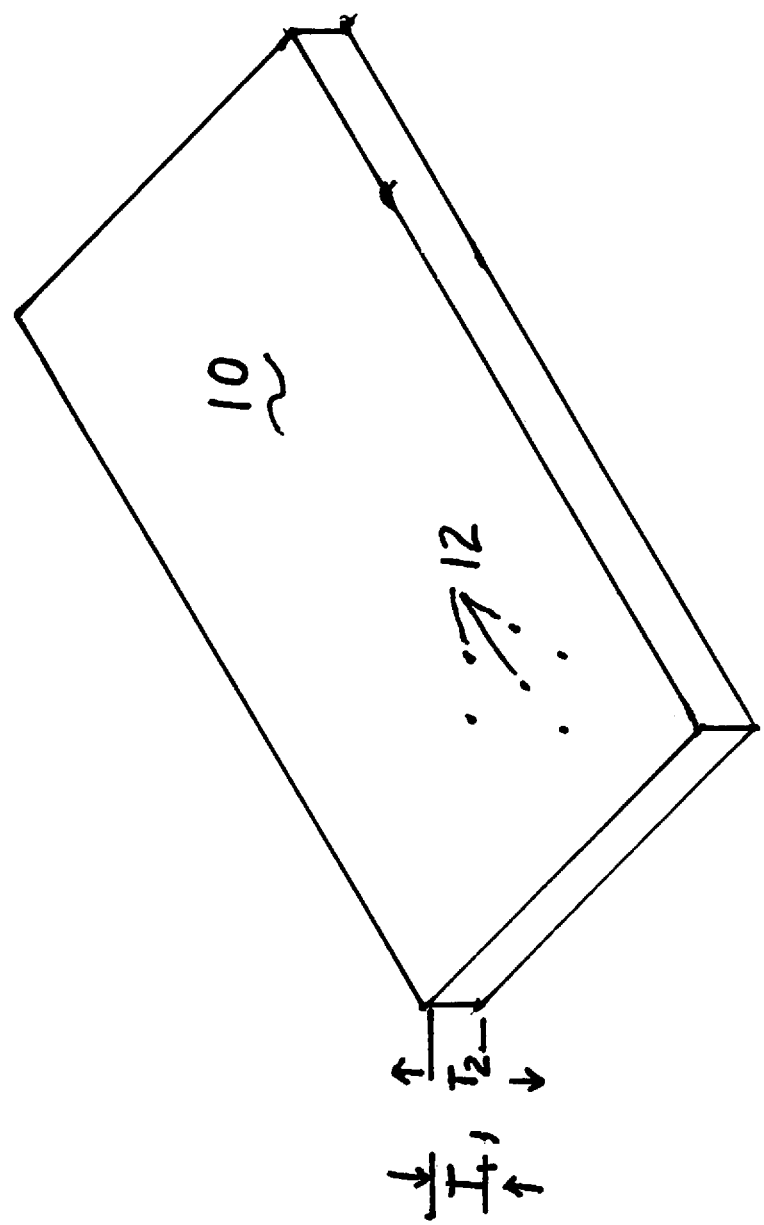

NIGHT VISION FILTER FOR USE WITH COMPUTER MONITOR SCREENS AND THE LIKE

Light-altering filters for use in correcting color and underwater photographs are disclosed and claimed in Applicant's U.S. Pat. No. 4,542,959.

Light-altering optical filters for use by law enforcement and military personnel in lowlight environments are described and claimed in Applicant's U.S. Pat. No. 6,158,865.

Laptop and notepad computers are widely used today by military and law enforcement personnel in nighttime operations and other lowlight conditions. In these operations, it is important that the night vision capabilities of the computer user not be adversely affected, i.e., the light coming from the computer screen should not adversely affect the ability of the computer user to see in the dark or in lowlight conditions as well as possible. It is also important that the light reflected from the face of the computer user not provide an opponent with an opportunity to harm the computer user.

It is an object of the present invention to provide a light modifying optical filter to be placed between the computer monitor screen and the face of the computer user.

It is a more specific object to provide a light modifying optical filter of this type which will modify the light projected from the computer screen so as to meet or at least address the problems suggested above.

Other objects and advantages of the invention will be apparent upon reading the following detailed description and upon reference to the drawings. Throughout the drawings, like reference numerals refer to like parts.

BRIEF DESCRIPTION OF THE DRAWING

FIG. 2 is an isometric drawing of a computer monitor screen made in accordance with the invention.

Figure 1:
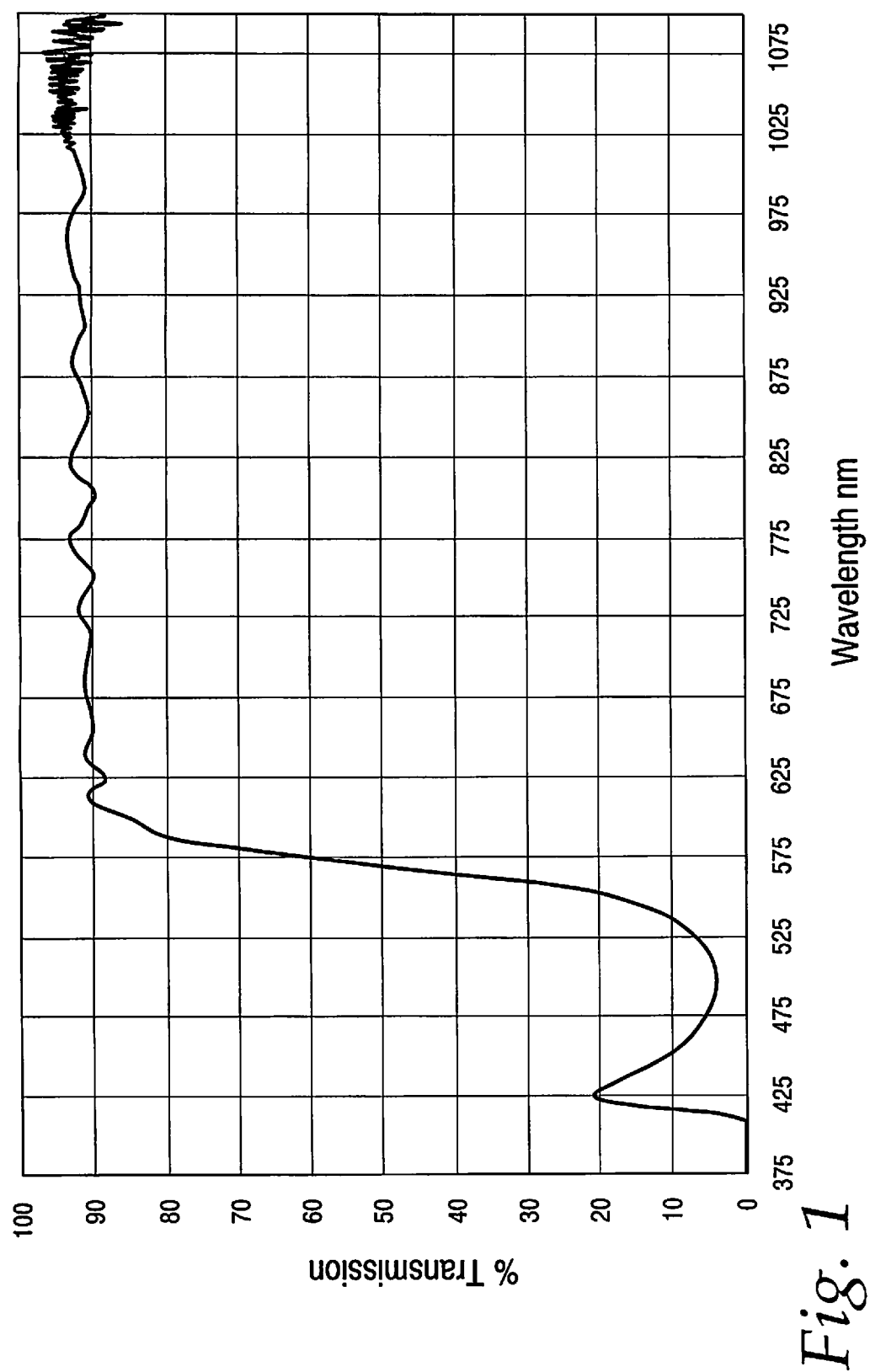
FIG. 1 is a graph showing the amount of transmission of specific wavelengths of light of the novel light-altering filter made in accordance with the invention. This curve is sometimes referred to as the filter's spectral transmissions response curve.

The filter 10 will have the optical or light passing characteristics shown in this table:

| Wavelength (nm) | % Transmission |
|---|---|
| Ranges from about 390 to about 410 | 0.1 |
| Ranges from about 410 to about 415 | 10 |
| Ranges from about 420 to about 430 | 27 |
| Ranges from about 445 to about 455 | 15 |
| Ranges from about 460 to about 475 | 9 |
| Ranges from about 490 to about 505 | 6 |
| Ranges from about 510 to about 525 | 7 |
| Ranges from about 540 to about 550 | 18 |
| Ranges from about 560 to about 576 | 50 |
| Ranges from about 590 to about 606 | 87 |
| Ranges from about 690 to about 707 | 90 |
| Ranges from about 750 to about 1000 | 90 |

This optical filter 10 will change a perceived green color illumination of a user's face to a brown tone when an opponent or second party is using a night vision mask intensifier such as a U.S. Military PVS-14 device. That known PVS-14 device utilizes P-43 and similar known monochrome materials.

When made in a thin-film embodiment and laid over a computer as other device having a touch-screen monitor, the touch-screen capability can be maintained. The filter can have scratch-resistant and/or glare reduction characteristics. If desired, the filter can have reduced viewing angly or light emission angle properties. It can have a relatively small thickness T2 so as to allow its attachment to display or monitor without requiring additional monitoring devices and without interfering with the closing of any covers or lids. It can have a sufficient thickness T1 to maintain mechanical rigidity when mounted in a frame or when it is free-standing.

The filters can be fabricated from optical grade polycarbonate infused with suitable organic dyes to produce the spectral characteristics disclosed and claimed here.

What is claimed is:

1. An optical filter applied to a computer monitor screen, the filter yielding a reduction in the dark adaptation time when transitioning from the eye illuminated through the filter to the unaided eye in a darkened environment that requires scotopic vision, the filter comprising a transparent element and passing impinging light wavelengths as:

| Wavelength (nm) | % Transmission |
|---|---|
| Ranges from about 390 to about 410 | 0.1 |
| Ranges from about 410 to about 415 | 10 |
| Ranges from about 420 to about 430 | 27 |
| Ranges from about 445 to about 455 | 15 |
| Ranges from about 460 to about 475 | 9 |
| Ranges from about 490 to about 505 | 6 |
| Ranges from about 510 to about 525 | 7 |
| Ranges from about 540 to about 550 | 18 |
| Ranges from about 560 to about 576 | 50 |
| Ranges from about 590 to about 606 | 87 |
| Ranges from about 690 to about 707 | 90 |
| Ranges from about 750 to about 1000 | 90. |

2. An optical filter further to claim 1 that passes impinging light wavelengths as:

| Wavelength (nm) | % Transmission |
|---|---|
| 400 | 0.1 |
| 410 | 10 |
| 420 | 27 |
| 450 | 15 |
| 465 | 9 |
| 495 | 6 |
| 515 | 7 |
| 545 | 18 |
| 564 | 50 |
| 594 | 87 |
| 693 | 90 |
| 1000 | 90. |

3. An optical filter applied to a computer monitor screen in a darkened environment, the screen yielding a reduction in the level of illumination of the user's face by the display or the eyepiece passing impinging light wavelengths as:

| Wavelength (nm) | % Transmission |
|---|---|
| Ranges from about 390 to about 410 | 0.1 |
| Ranges from about 410 to about 415 | 10 |
| Ranges from about 420 to about 430 | 27 |
| Ranges from about 445 to about 455 | 15 |

-continued

| Wavelength (nm) | % Transmission |
|---|---|
| Ranges from about 460 to about 475 | 9 |
| Ranges from about 490 to about 505 | 6 |
| Ranges from about 510 to about 525 | 7 |
| Ranges from about 540 to about 550 | 18 |
| Ranges from about 560 to about 576 | 50 |
| Ranges from about 590 to about 606 | 87 |
| Ranges from about 690 to about 707 | 90 |
| Ranges from about 750 to about 1000 | 90. |

4. An optical filter further to claim 3 that passes impinging light wavelengths as:

| Wavelength (nm) | % Transmission |
|---|---|
| 400 | 0.1 |
| 410 | 10 |
| 420 | 27 |
| 450 | 15 |
| 465 | 9 |
| 495 | 6 |
| 515 | 7 |
| 545 | 18 |
| 564 | 50 |
| 594 | 87 |
| 693 | 90 |
| 1000 | 90. |

5. An optical filter that in a darkened environment changes the perceived green color illumination of the user's face to brown tones when using PVS-14 image intensifier devices that utilize P-43 phosphors and similar monochrome phosphors and passes impinging light wavelengths as:

| Wavelength (nm) | % Transmission |
|---|---|
| Ranges from about 390 to about 410 | 0.1 |
| Ranges from about 410 to about 415 | 10 |
| Ranges from about 420 to about 430 | 27 |
| Ranges from about 445 to about 455 | 15 |
| Ranges from about 460 to about 475 | 9 |
| Ranges from about 490 to about 505 | 6 |
| Ranges from about 510 to about 525 | 7 |
| Ranges from about 540 to about 550 | 18 |
| Ranges from about 560 to about 576 | 50 |
| Ranges from about 590 to about 606 | 87 |
| Ranges from about 690 to about 707 | 90 |
| Ranges from about 750 to about 1000 | 90. |

6. An optical filter according to claim 5 having computer touch screen.

7. An optical filter further to claim 5 having a surface treatment that affords resistance to scratches.

8. An optical filter further to claim 5 and possessing a surface treatment that reduces glare.

9. An optical filter further to claim 5 and possessing a surface treatment that reduces the viewing angle of the display thereby yielding viewing privacy the user.

10. An optical filter further to claim 5 and of a maximum thickness to allow easy attachment to displays without requiring additional mounting devices and without interference to the satisfactory closing of any covers or lids.

11. An optical filter further to claim 5 and of a minimum thickness to maintain mechanical rigidity with the filter element mounted in a frame.

\* \* \* \* \*